United States Patent
Thurier et al.

(10) Patent No.: US 12,547,742 B2
(45) Date of Patent: Feb. 10, 2026

(54) METHOD, PROGRAM, AND APPARATUS FOR PROCESSING SENSITIVE DATA

(71) Applicant: Xero Limited, Wellington (NZ)

(72) Inventors: Quentin-Gabriel Thurier, Wellington (NZ); Soon-Ee Cheah, Wellington (NZ)

( * ) Notice: Subject to any disclaimer, the term of this patent is extended or adjusted under 35 U.S.C. 154(b) by 0 days.

(21) Appl. No.: 18/708,961

(22) PCT Filed: Nov. 4, 2022

(86) PCT No.: PCT/NZ2022/050137
§ 371 (c)(1),
(2) Date: May 9, 2024

(87) PCT Pub. No.: WO2023/085952
PCT Pub. Date: May 19, 2023

(65) Prior Publication Data
US 2025/0021668 A1    Jan. 16, 2025

(30) Foreign Application Priority Data
Nov. 12, 2021 (AU) ................ 2021903641

(51) Int. Cl.
*G06F 21/60* (2013.01)
*G06F 40/284* (2020.01)
*G06N 3/04* (2023.01)

(52) U.S. Cl.
CPC .......... *G06F 21/602* (2013.01); *G06F 40/284* (2020.01); *G06N 3/04* (2013.01)

(58) Field of Classification Search
CPC .... G06F 21/602; G06F 40/284; G06F 40/216; G06F 21/6254; G06N 3/04; G06N 3/08
See application file for complete search history.

(56) References Cited

U.S. PATENT DOCUMENTS 11,308,320 B2 * 4/2022 Lee ............. G06V 30/418
2014/0150086 A1 5/2014 Horst
(Continued)

OTHER PUBLICATIONS

Vinayakumar R et al: "Deep encrypted text 1-15 . categorization", 2017 International Conference On Advances in Computing, Communications and Informatics (ICACCI), IEEE, Sep. 13, 2017 (Sep. 13, 2017), pp. 364-370, XP033275974, [retrieved on Nov. 30, 2017].

(Continued)

*Primary Examiner* — Sm A Rahman
(74) *Attorney, Agent, or Firm* — Young Basile Hanlon & MacFarlane, P.C.

(57) ABSTRACT

An apparatus, program, and method provide data processing functions for processing text statements. A training phase of the data processing function includes: tokenizing each of a plurality of training text statements into respective training sets; determining, among the training sets, the vocabulary size, and a reference set of text tokens, being a subset of the unique text tokens; generating a reference set of hash values by hashing each of the reference set; for each tokenized training text statement, producing an encoded version comprising: for each text token that hashes to one of the reference set of hash values, the hash value; training the data processing function based on the encoded versions of the tokenized text statements. A live phase of the data processing function includes: producing an encoded version of the tokenized input text statement; executing the trained data processing function on the encoded version of the input text statement.

18 Claims, 5 Drawing Sheets

(56) References Cited

U.S. PATENT DOCUMENTS

2018/0341630 A1\* 11/2018 DeVries .................. G06F 40/14
2020/0311304 A1 10/2020 Parthasarathy
2021/0248268 A1 8/2021 Ardhanari et al.
2022/0269863 A1\* 8/2022 Araki .................... G06F 40/169

OTHER PUBLICATIONS

Badawi Ahmad Al et al: "PrivFT: Private and Fast Text Classification With Homomorphic Encryption", IEEE Access, IEEE, USA, vol. 8, Dec. 17, 2020 (Dec. 17, 2020), pp. 226544-226556, XP011828509, [retrieved on Dec. 28, 2020].
Joulin Armand et al: "Bag of Tricks for Efficient Text Classification", Aug. 9, 2016 (Aug. 9, 2016), pp. 1-5, XP093296135, Retrieved from the Internet: URL:https://arxiv.org/pdf/1607.01759 [retrieved on Jul. 15, 2025].

\* cited by examiner

METHOD, PROGRAM, AND APPARATUS FOR PROCESSING SENSITIVE DATA

CROSS-REFERENCE TO RELATED APPLICATION(S)

This application is a national stage 371 application of PCT/NZ2022/050137, filed on Nov. 4, 2022, which claims priority to and the benefit of Australian Patent Application Serial No. 2021903641, filed Nov. 12, 2021, the entire disclosures of which are hereby incorporated by reference.

INTRODUCTION

This invention lies in the field of data security and data processing, and in particular relates to hashing text statements for input to a data processing function.

BACKGROUND

Users of software, and in particular web-based multi-subscriber software, may initiate data processing functions that execute on data input by the user to provide a data processing result to the user. The data processing function may leverage data from multiple users in the execution. The data may be sensitive insofar as it is private to the user and not to be shared with other subscribers. It is desirable to maintain anonymity between users, and to store and transmit user data in a manner that enables the user data to be leveraged in providing data processing results to users, but does not expose sensitive data to risk of exposure to other users or to malevolent agents.

Hashing algorithms provide a mechanism to mask or encode data whilst preserving diversity between values. Hashing algorithms can generally not be reverse engineered, or can only be reverse engineered with a very high degree of difficulty.

Hashing algorithms hash input data to one of a plurality of hash values (i.e. bins or buckets). Depending on the diversity in input data, and the number of buckets or bins, it is feasible that plural input data values may hash to the same bin. This is known as a collision and may result in lack of accuracy, unintended outputs, and performance impedance in data processing functions leveraging the hash values.

Collisions may be minimized or suppressed by appropriate configuration of a hashing algorithm to hash to a big hash value space. However, big hash value spaces are associated with big memory footprints and in particular lead to performance overheads in data processing functions executing on the hash value space.

It is desirable to provide mechanisms which store and transmit sensitive data in a secure manner whilst avoiding degradation in processing results caused by hashing collisions and avoiding performance overheads caused by large hashing spaces.

SUMMARY

A method of providing a data processing function for processing sensitive text statements, comprising: in a training and preprocessing phase of the data processing function: tokenizing each of a plurality of training text statements into respective training sets of text tokens; determining, among the plurality of training sets of text tokens, the vocabulary size, being the number of unique text tokens, and a reference set of text tokens, being a subset of the unique text tokens selected by applying a usage criteria to each of the unique text tokens; generating a reference set of hash values by executing a hashing algorithm on each of the reference set of text tokens, the hashing algorithm being configured to have a number of bins exceeding the vocabulary size; for each tokenized training text statement, producing an encoded version of the respective training text statement comprising: for each text token that hashes to one of the reference set of hash values, the hash value; and for each remaining text token, a nil, null, or generic value; training the data processing function based on the encoded versions of the tokenized text statements; in a live phase of the data processing function: producing an encoded version of the tokenized input text statement comprising: for each text token that hashes to one of the reference set of hash values, the hash value; and for each remaining text token, a nil, null, or generic value; executing the trained data processing function on the encoded version of the input text statement.

The method may be computer-implemented. The method may be computer-implemented by a computing apparatus or plural computing apparatus executing processing instructions causing the computing apparatus to perform the method individually or collectively. The processing instructions may be stored on a non-transient computer-readable medium.

Optionally, the training and preprocessing phase further comprises determining the n most common text tokens, and wherein the usage criteria is satisfied if the text token is a member of the n most common text tokens. The number n may be referred to as reduced vocabulary size or a reference set vocabulary size, since n defines a number of unique values in the reference set, and is a number reduced with respect to a vocabulary size of the population of text tokens. In other words, variability, detail, diversity, information, is sacrificed in the transform from text tokens to hash values. The number of hash values that the hashing algorithm can potentially hash to i.e. the number of bins, is many times greater than the number n the number of unique values in the reference set, thereby reducing risk of collisions at the expense of a more complex hashing algorithm and associated performance overheads.

Optionally, the nill, null, or generic value is a generic value, being a fixed common value; and producing the encoded version of the tokenized input text statement and/or producing the encoded version of the tokenized training text statement, includes replacing any hash value that does not match a member of the reference set of hash values with the generic value.

Optionally, the data processing function comprises an artificial neural network including an embedding layer, the embedding layer comprising an embedding matrix in which each hash value of the reference set of hash values maps to a unique row, each row defining a vector for the member of the reference set of hash values mapping to the row, the vector being an m-dimensional embedding. The dimension of the embedding space m is a number of columns of the embedding matrix and may be 32, 64, 128 etc.

Optionally, in the live phase, the artificial neural network is configured to predict a label, from among a defined set of labels, a user will assign to an input text statement; in the training phase: a label is associated with each training text statement via manual or semi-manual assignment; the vector for each of the reference set of hash values being configured according to the labels assigned to training text statements for which the respective hash value appears in the encoded version.

Optionally, in the live phase, the artificial neural network is configured to generate a quantitative representation of a likelihood of each of a predefined list of labels being assigned to an input text statement by a user; in the training phase: a label is associated with each training text statement via manual or semi-manual assignment; the vector for each of the reference set of hash values being configured according to the labels assigned to training text statements for which the respective hash value appears in the encoded version.

Optionally, the artificial neural network comprises a custom layer preceding the embedding layer, the custom layer being configured to accept, as an input, in the training phase the encoded version of the training text statement, and in the live phase the encoded version of the input text statement, to translate each hash value that matches one of the reference set of hash values into a pointer to the row of the embedding matrix mapped to by the respective hash value.

Optionally, the hashing algorithm is configured to have a number of bins that is at least 2 times, or at least 3 times, the vocabulary size. Optionally, the hashing algorithm is configured to have a number of bins that is at least 100 times, at least 200 times, at least 300 times, at least 400 times, at least 500 times, or at least 1000 times, the reference set vocabulary size. Optionally, the vocabulary size of the population of text tokens is at least 2 times, at least 3 times, or at least 5 times the vocabulary size of the reference set of hash tokens.

Optionally, the number n of most common text tokens is 10000 or 20000. Optionally the number m of columns in the embedding matrix is 32, 64, or 128.

Optionally, the number of bins of the hashing algorithm is greater than 1 million, greater than 5 million, or greater than 10 million.

Embodiments include a system comprising a user device and a server apparatus, the server apparatus being configured to, in a training and preprocessing phase of a data processing function: tokenize each of a plurality of training text statements into respective training sets of text tokens; determine, among the plurality of training sets of text tokens, the vocabulary size, being the number of unique text tokens, and a reference set of text tokens, being a subset of the unique text tokens (having a reference set vocabulary size at not more than a fifth, not more than a third, or not more than a half of the vocabulary size of the set of text tokens) selected by applying a usage criteria to each of the unique text tokens; generate a reference set of hash values by executing a hashing algorithm on each of the reference set of text tokens, the hashing algorithm being configured to have a number of bins exceeding the vocabulary size; for each tokenized training text statement, produce an encoded version of the respective training text statement comprising: for each text token that hashes to one of the reference set of hash values, the hash value; and for each remaining text token, a nil, null, or generic value; train the data processing function based on the encoded versions of the tokenized text statements; the user device being configured to, in a live phase of the data processing function: obtain a series of hash values by executing the hashing algorithm on each text token among a tokenised input text statement; communicate the series of hash values to the server apparatus; the server apparatus being configured to, in the live phase of the data processing function: edit the series of hash values to produce an encoded version of the input text statement comprising: for each hash value matching one of the reference set of hash values, the hash value; and for each remaining hash value, a nil, null, or generic value; execute the data processing function on the encoded version of the input text statement; return an outcome comprising or based on the result of the execution of the data processing function to the user device.

Embodiments further include a computer program or suite of computer programs that when execute, cause a method disclosed herein to be performed. For example, a computer program may be executed on the user device to execute the functionality attributed thereto, and a computer program may be execute on the server to execute the functionality attributed thereto.

Advantageously, embodiments increase security in handling sensitive text statements, by executing the data processing function on an encoded version of the input text statement. The service provided by the data processing function is enjoyed without the input text statement itself being processed. Therefore the input text statement can be discarded (i.e. erased, deleted), and does not need to be transferred, retained, or otherwise processed.

Furthermore, even though only hash values of the reference set of text tokens are required in the encoding, the hashing algorithm (i.e. hashing function) is configured to have a number of bins that is greater than the vocabulary size (for example, the reference set of hash values may have 10000 or 20000 members whereas the number of bins may be 10 million). Therefore, a risk of collisions (i.e. two text tokens hashing to the same bin) is greatly reduced, whilst at the same time suppressing a number of different values that appear in the encoded versions. Suppressing the number of different values that appear in the encoded versions constrains variability of inputs to the data processing function, so that the data processing function can be trained and executed in a computationally efficient manner. For example, the data processing function may rely on an embedding matrix to represent the training data, and embodiments enable a number of training data entries to be set at a value such as n, the number of most common text tokens stored in the reference set of hash values (reference set vocabulary size).

Efficiency of execution of the data processing function is achieved by requiring a lookup of hash values against a reference set of hash values having n members, which is more efficient than lookups against a larger set. A memory footprint of the data processing function is suppressed by limitation of the number of different hash values appearing in the encoded versions.

Embodiments include apparatus, program, and method of providing a data processing function for processing text statements. In a training phase of the data processing function: tokenizing each of a plurality of training text statements into respective training sets; determining, among the plurality of training sets, the vocabulary size, and a reference set of text tokens, being a subset of the unique text tokens; generating a reference set of hash values by hashing each of the reference set; for each tokenized training text statement, producing an encoded version comprising: for each text token that hashes to one of the reference set of hash values, the hash value; training the data processing function based on the encoded versions of the tokenized text statements. In a live phase of the data processing function: producing an encoded version of the tokenized input text statement; executing the trained data processing function on the encoded version of the input text statement.

DETAILED DESCRIPTION

Embodiments are described below, with reference to the accompanying drawings, in which.

Figure 1:
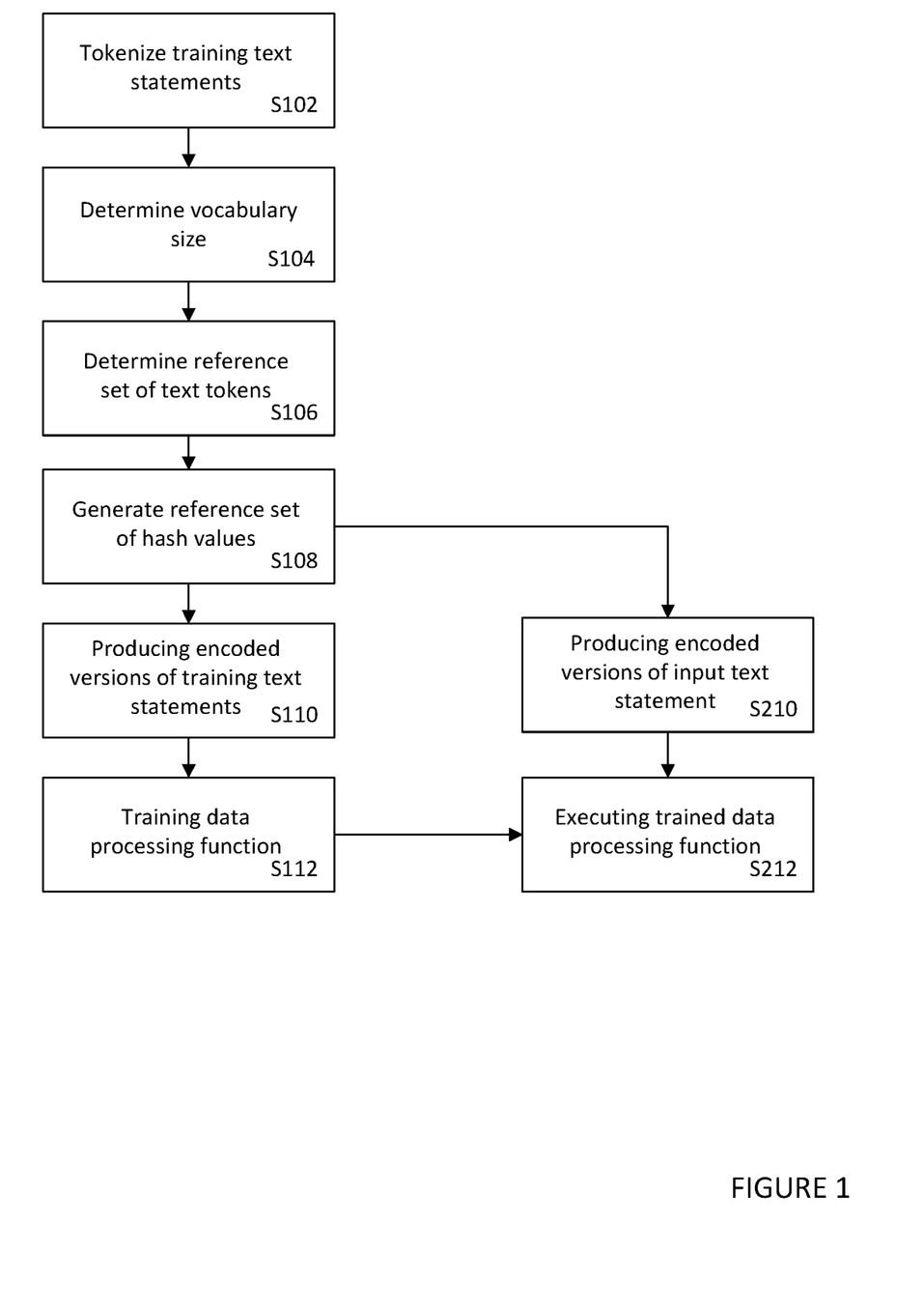
FIG. 1 is a flowchart illustrating a method of an embodiment.

FIG. 1 is a flowchart illustrating a method of an embodiment. The arrows define an order in which method steps are performed, though it is noted that deviations from the illustrated order are feasible. For example, the two determining steps S104 and S106 are not dependent on one another and the order in which they are performed is arbitrary. Generating the reference set of hash values S108 is a prerequisite for steps S110 producing encoded versions of training text statements and S210 producing encoded version of input text statement. Training the data processing function at S112 is a prerequisite for executing the trained data processing function on the encoded version of the input text statement at S210.

Steps S102 to S112 on the left hand side of FIG. 1 illustrate a training and preprocessing phase of a data processing function. Steps S210 to S212 on the right hand side of FIG. 1 illustrate a live phase of the data processing function. Even after training and deployment of the trained data processing function (i.e. steps S112 (training) and step S212 (deployment)), the training may be periodically updated or repeated, with updated training text statements. Once the hashing algorithm has been configured at S108, text statements input during the live phase may be stored in hashed form (i.e. tokenized and then hashed) as future training text statements, in association with a label or other classification assigned by a user.

The data processing function is a service or other type of function for transforming input data into output data. The data processing function may be an artificial intelligence algorithm such as a classification algorithm or ranking algorithm. The data processing function may be executed on the same computer that generates the encoded versions, or may be executed by a different computer so that the processing implicitly includes some data transfer or communication. In particular, the data processing function may be part of a web application which executes remotely in relation to a local user device at which a text statement is input and the result of the data processing function is used.

The method of FIG. 1 particularly relates to handling and processing sensitive text statements, which is an indication that there is some security and/or anonymity requirements associated with the text statements. Sensitive text statements are strings or other data objects composed of text characters (including alphanumeric characters and optionally also punctuation) the content of which is considered private, restricted, or secure, so that it is desirable not to store or process the sensitive text statements themselves. But nonetheless, it is desirable to provide data processing functionality for the sensitive text statements.

The training and preprocessing phase of a data processing function is a configuration of the data processing function for a particular implementation scenario. The preprocessing phase may be considered to be steps S102 to S110 and is the preparation of data for a training phase. The training phase S112 may be considered to be step S112, and may include the configuration of an algorithm by the preprocessed training data.

Step S102 is a tokenizing step and may comprise tokenizing each of a plurality of training text statements into respective training sets of text tokens. Tokenizing is a process of splitting a text statement into a series or set of tokens. The text content, i.e. the words themselves, are preserved in the tokenizing process, whereas characters such as blank spaces and punctuation may be lost in the tokenizing process. Each token may correspond to a set of characters appearing between spaces (or between start/end of text statement and space), optionally with punctuation having been removed in a preprocessing step. So that, for example, each text token corresponds to a word or number or combination thereof. Optionally, numeric characters may be removed in a preprocessing step so that only alphabetic characters remain.

At step S104 the vocabulary size for the plurality of training sets of text tokens is determined. The vocabulary size is the number of unique text tokens appearing in the tokenized training text statements, and may be based on a count from the tokenized training text statements themselves, or from another dataset from a corresponding data processing function, or, for example, from a preceding training phase of the same data processing function (noting that the training may be periodically updated). The vocabulary size may also be considered to be the number of unique text token values among the population of text tokens obtained at S102.

S106 comprises determining a reference set of text tokens. S106 may comprise determining the reference set of text tokens, being a subset of the unique text tokens selected by applying a usage criteria to each of the unique text tokens. For example, the usage criteria may be, or may include or be satisfied, that the text token (i.e. the text token value) is among the n most common text tokens appearing in the population of text tokens obtained at S102. Wherein population is taken to refer to the aggregation of all of the sets of text tokens (one set being one training text statement). For example, n may be not more than 1000, not more than 2000, not more than 5000, not more than 10000. The number n may be between 8000 and 12000, between 12000 and 16000, between 16000 and 20000, or between 18000 and 22000. The n may be between 5000 and 15000, or between 15000 and 25000. The number n refers to a vocabulary size of the reference set of text tokens, and is a reduced vocabulary size relative to the vocabulary size of the population of text tokens. The number n may be a fixed fraction or a fixed range of fractions of the vocabulary size of the population of text tokens. That is, the ratio of vocabulary size of population of text tokens to vocabulary size of reference set of text tokens may be a fixed value, fixed at, for example, 2, 3, or 5. The usage criteria may be, or may include, a minimum number of appearances of the text token value in the population. For example, the reference set may be all text token values appearing ten or more times in the population. In addition, the reference set of text tokens may include a predefined set of text tokens of particular significance in the domain of the data processing function. For example, the labels or classification names themselves.

At S108 a reference set of hash values is generated by executing a hashing algorithm on each text token among of the reference set of text tokens (that is to say, the reference set of text tokens are hashed individually, not as a composite). The hashing algorithm is a cryptographic hash function that maps input data to a fixed-size bit array. The number of bins or buckets to which the hashing algorithm hashes input data is configurable by appropriate selection and/or manipulation of the hashing algorithm. The said number may be, for example, 1 million, 2 million, 5 million, or 10 million. Each bin or bucket is labelled, assigned, attributed, or otherwise associated with, a hash value, which may be an integer, a string, or some other data item capable of having a number of different values (the number being at least the number of bins). The hashing algorithm cannot be reversed, other than by potential "brute force" type attacks, which means the hash values are considered to be a secure representation of the sensitive text. The number of bins may be set to be, for example, at least 2, at least 3, at least 4, at least 5, at least 10, at least 100, at least 200, at least 500, or at least 1000 times the vocabulary size. Embodiments may be executed on servers pre-loaded with a plurality of cryptographic hash functions each having a different number of bins to which input data is hashed, so that an appropriate cryptographic hash function is selected at S108 based on the vocabulary size determined at S104.

The reference set of hash values generated at S108 is an artefact of the training and preprocessing phase that is leveraged in the live phase (in addition to the trained data processing function or the values of the configurable parameters embodying the trained data processing function) and is a set of size n wherein each member is a hash value of a different one of the reference set of text tokens. The reference set of hash values is the set of values with which the data processing function is trained. In other words, the inputs that can be interpreted by the data processing function.

At S110 encoded versions of the training text statements are produced. For example, S110 includes producing an encoded version of the respective training text statement comprising: for each text token that hashes to one of the reference set of hash values, the hash value; and for each remaining text token, a nil, null, or generic value.

There is implied comparing, matching, and/or filtering at S110. It is noted that the comparing, matching, and/or filtering may be executed in the text token space or in the hash value space. There are performance advantages and security advantages associated with performance in the hash value space (that is, hashing the training text statements with the hashing algorithm and then comparing with the reference set of hash values to determine matches).

Generating the encoded version of each training text statement at S110 is a non-reversible processing step that reduces the amount of information in each set of text tokens. The set of text tokens is reduced to a set of values, comprising hash values from among the reference set of hash values for text tokens hashing to a hash value matching one of the reference set of hash values, and nil or generic (i.e. common, fixed value) value for text tokens hashing to a hash value not matching one of the reference set of hash values. The text tokens not matching any of the n most common text tokens may not be represented at all in the encoded version, or may be represented by a generic value, i.e. a fixed common value (i.e. all text tokens not matching any of the n most common text tokens map to the same single value in the encoding, the single value being the fixed common value). Wherein fixed denotes the value is a predefined value that is known to the data processing function, and wherein common denotes that the same value is used across the population. The fixed common value may be considered to be a pseudo hash value and may be referred to as the pseudo hash value (i.e. it may have the form of a hash value but was assigned to the text tokens by a process other than executing the hashing algorithm).

At S112 the data processing function is trained. S112 comprises training the data processing function based on the encoded versions of the tokenized text statements. Training may be automated (for example, unsupervised machine learning), semi-automated (for example, supervised machine learning), semi-manual or manual. The data processing function may comprise configurable parameters, such as an embedding matrix, weights, lists and biases in layers of a neural network, that are configurable during a training phase. Sample inputs (in this case training sets of text tokens) are associated with respective desired outputs, and the training process configures the configurable parameters to fit the actual outputs of the data processing function to the desired outputs. The desired outputs may be a quantitative representation or classifications or may be one or more numerical values, for example representing chance or likelihood of the input being associated with one or more different outputs. The desired outputs may be referred to as labelling. Desired outputs may be obtained by or accepted from input from experts or, for example, by historical user data. In the embedding matrix, a number of coordinates m, i.e. 32, 64, or 128, each corresponding to a different notional dimension are used to represent or translate each hash value from the reference set of hash values (noting that each hash value is mapped to by a text token), wherein differences and similarities between text tokens (cf hash values) are determined by associations pointing to the same or different assigned labels. The number m represents a dimension of the embedding space, that is, a number of columns of the embedding matrix. Text tokens that are labelled with the same or similar labels are close to one another in the embedding space (i.e. are represented by close or similar coordinates in the embedding matrix). In the training, the embedding matrix is built up based on content of the training text statements and the assigned labels, and a series of neural network layers that process the embedding matrix with configurable weights and biases are configured.

The live phase at steps S210 to S212 is the operation of the data processing function in an environment in which input data is received (for example from a user) and there is no associated desired outcome (i.e. labelling), so the output is unknown and is to be determined by the trained data processing function. For example, the live phase may be performed during a user session of software including the data processing function.

The tokenized input text statement is a tokenized version of an input text statement, the input text statement being live data in the implementation of the data processing function. The input text statement is received via a user interface, and tokenized via a tokenizing function. The tokenizing function may be the same tokenizing function as in the training phase. The input text statement is sensitive, that is, the content of the input text statement should not be publicly available nor obtainable by a third party, so that its content is hidden other than to the user and software provider (i.e. provider of software including the data processing function). To this end, security is enhanced if the input text statement is stored and processed by the data processing function in a manner in which its content is hidden, encrypted, or otherwise non-derivable.

At S210 an encoded version of the input text statement is obtained. The processing is the same as is performed at S110 for the training text statements. In particular, step S210 includes producing an encoded version of the tokenized input text statement comprising: for each text token that hashes to one of the reference set of hash values, the hash value; and for each remaining text token, a nil, null, or generic value. Noting that because the vocabulary size of the text tokens (i.e. the overall vocabulary size) is greater than the vocabulary size of the reference set of hash values, it will sometimes be the case that not all text tokens in an input text statement map to a hash value belonging to the reference set of hash values. For example, a series of hash values may be obtained by executing the hashing algorithm on each text token of the tokenized input text statement. The obtaining a series of hash values is by running the same hashing algorithm as was executed in the training phase, this is a requirement because the trained data processing function is trained based on hash values output by said hashing algorithm. It is noted that the entire tokenized input text statement may be hashed even though some of the hash values will subsequently be discarded (i.e. set to nil, null, or the generic value). This is so that the content of the sensitive text statement can be compared with the n most common text tokens in the hashing space rather than in the text space, so that the comparison step is secure and does not involve processing sensitive text data.

The encoded version of the input text statement is an edit of the hash values obtained by hashing the tokenized input text statement. Data is discarded from the series of hash values so that, unless all text tokens hash to hash values among the reference set of hash values, there is less information in the encoded version than in the original input text statement. Furthermore the information is encrypted. By comparison with the reference set of hash values, the hash values corresponding to text tokens from among the n most common text tokens are determined (collisions notwithstanding). The remaining hash values may be either discarded, or replaced by the fixed common value, depending on the implementation. The result of the discarding or replacement is the loss of information from input text statement to encoded version, which loss inherently enhances security of the sensitive content, and reduces memory footprint and transmission overheads. Once the edit is complete, the encoded version of the input text statement is obtained and is ready for processing by the trained data processing function at S212.

The executing the data processing function at S212 is the live execution of the data processing function to obtain output data, which may be, for example, a classification, a likelihood, or a series of likelihoods.

The methods, programs, and apparatus disclosed herein provide a mechanism to enable a user to benefit from a software service (i.e. the data processing function) that processes sensitive text statements, without compromising the security of the data.

Figure 2:
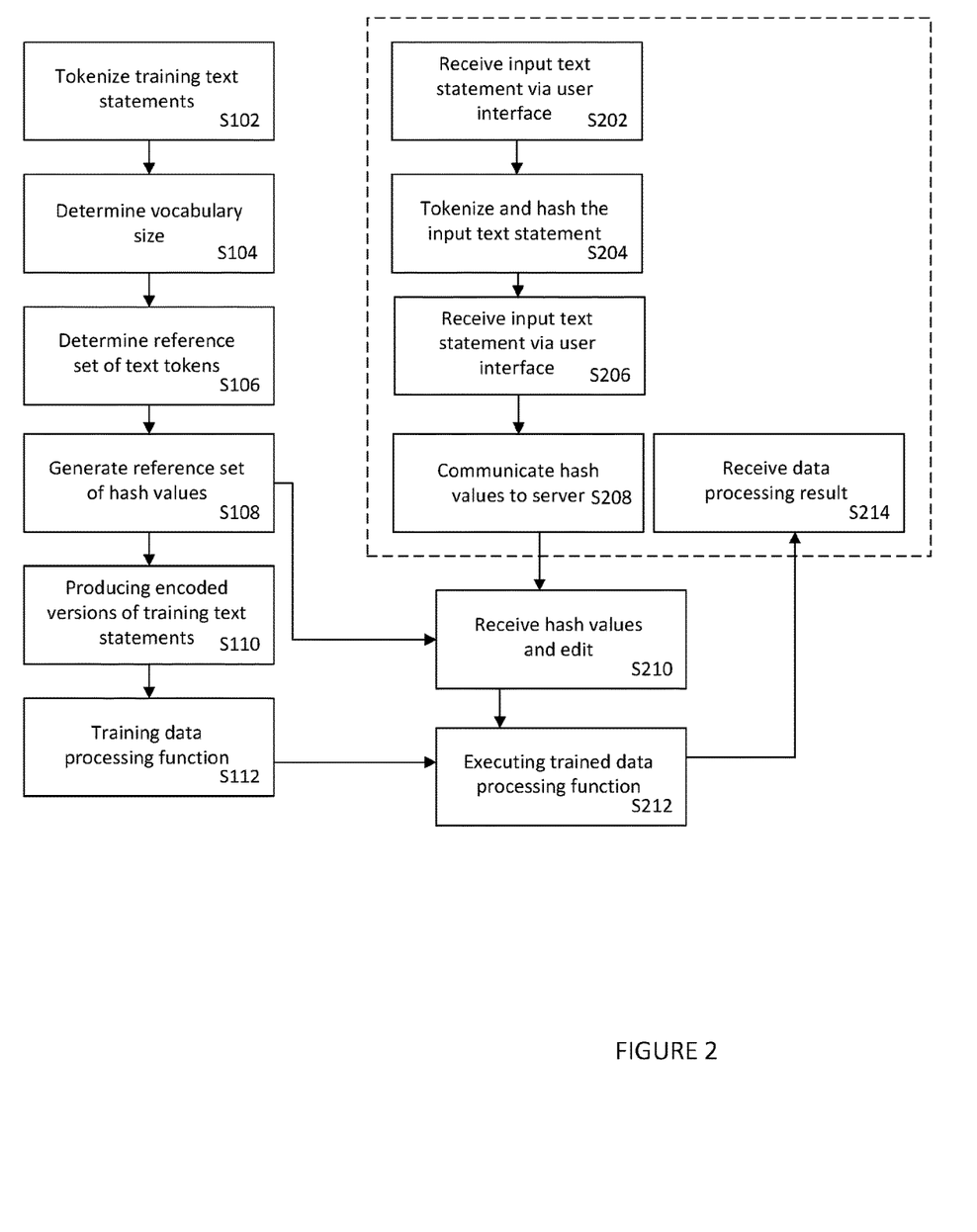
FIG. 2 is a flowchart illustrating a method of an embodiment.

FIG. 2 illustrates a method performed at a user device (those steps within the hashed box) and a server. The user device may be, for example, a smartphone, a tablet, or a personal computer. The server is remote from the user device and may be, for example, a web server. The preprocessing and training phase is as discussed above in relation to FIG. 1. In the live phase, at S202 a text statement is input to a user interface by the user. At S204 the user device tokenizes and hashes the input text statement, noting that the hashing is with the hashing algorithm of S108. The hashing algorithm may be a cryptographic hash function stored at the user device as part of the web application to which the data processing function belongs, noting that the web application divides processing between the user device and the server. The user input text statements are tokenized and hashed in the first steps of the live phase processing and at that point the text may be discarded (in the context of the data processing function). The text statement itself is not stored, transmitted, nor processed, beyond the initial hashing.

In a multi-device system, for example where some processing is performed by a web-based application (webapp) running on a user device such as a smartphone or computer, and some processing is performed remotely such as at a cloud server or proprietary server of the data processing function provider, it may be that (in a live phase) the tokenizing function and the hashing algorithm execute on the user device as user-side functions of the webapp before the series of hash values are transmitted to a server for further processing (i.e. encoding and executing the data processing function).

Optionally, the reference set of hash values may be stored at the server side and not communicated to the user device, and so the production of the encoded version of the input text statement is completed at the server at S210 by editing the hash values received from the user device to edit out the hash values not belonging to the reference set (and replacing them with nil values or the generic value). The output/result of the data processing function is then obtained at S212 by executing the data processing function, and returned to the user device at S214 (optionally after being processed further) for use/view in the webapp.

An example implementation scenario is with respect to financial or accounting data. A user may have a text statement describing a banking or other financial transaction that is to be assigned to one of a plurality of classes in an account (for example the classes may be categories that describe the nature/purpose of the transaction so that similar transactions may be grouped with one another).

In the above example, the data processing function is such that whilst it may be technically feasible to execute the data processing function on a user device, the transmission overheads associated with transmitting the trained neural network and associated processing functions from a server to a user device render such an arrangement unwieldy, and thus it is preferable for the data processing function to be executed on the server side. However, executing the data processing function on the server side presents a security risk associated with the storage and transmission of sensitive data. Embodiments provide a technical solution to the technical problem of providing a server-side data processing function that operates on sensitive text without compromising the security of the sensitive text.

The data processing function may comprise an artificial neural network, such as a classifying artificial neural network or a ranking artificial neural network. In either case, rather than being trained with input text statements, the neural network is trained using input hash values. Furthermore, since very large, or m-dimensional embedding matrices represent a significant processing overhead, the methods, programs, and apparatus disclosed herein constrain the number of rows in the embedding matrices to, for example, a controllable parameter n, which is a number n of most common text tokens determined from the todenized input training text statements. The vocabulary size of the reference set of text tokens, i.e. n, is smaller than a vocabulary size of the text statements themselves, wherein the vocabulary size of the text statements may be defined based on a training set or in some other manner. However, a number of hashing bins is configured to be larger than the overall vocabulary size (i.e. number of unique text tokens across entire set of training text statements) so that risk of collisions is minimised.

Embodiments relate primarily to the preprocessing of text data for use in a data processing function such as an artificial neural network. The particular form and function of the data processing function is open. Embodiments may be implemented to preprocess data for an artificial neural network including an embedding matrix such as to provide a dense vector representation of the training data.

The number m of columns in the embedding matrix, that is, the dimension of the embedding space, is a configurable parameter depending on the implementation scenario and specific requirements. The number of columns is the number of coordinates allocated to encode the semantic information of the text tokens, and may be set at, for example, 32, 64, or 128.

Co-occurrence of text tokens in the same text statements as one another is captured in the embedding matrix, but indirectly, meaning that there is no explicit computation of the counts, which would defeat the purpose of a textual dense representation (embeddings). Instead, vectors are gradually adjusted during training, such that, if a token found in training text statements co-occurs often with a token found in (reconciled) account names, this should result in a fairly high similarity when measured on the final state of the matrix.

The embedding matrix is configured during training. The embedding matrix is a representation of the training data that is configured as more training data is included in the matrix.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Figure 3:
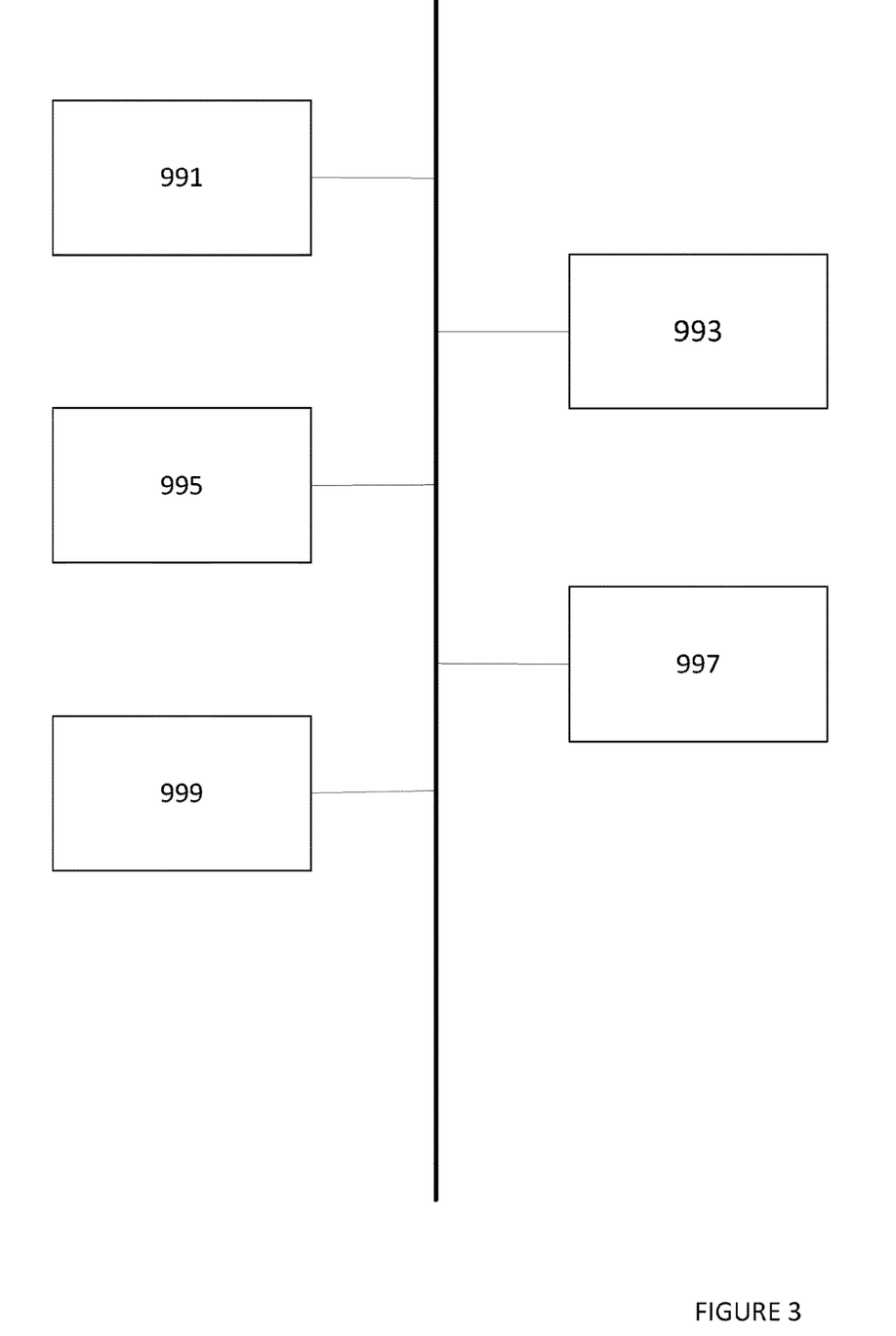
FIG. 3 illustrates a hardware configuration of a user device or a server of an embodiment.

FIG. 3 is a schematic illustration of a hardware arrangement of a computing apparatus. The user device and/or the server such as the web server may be implemented by apparatus having an arrangement such as illustrated in FIG. 3.

The computing apparatus comprises a plurality of components interconnected by a bus connection. The bus connection is an exemplary form of data and/or power connection. Direct connections between components for transfer of power and/or data may be provided in addition or as alternative to the bus connection.

The computing apparatus comprises memory hardware 991 and processing hardware 993, which components are essential regardless of implementation. Further components are context-dependent, including a network interface 995, input devices 997, and a display unit 999.

The memory hardware 991 stores processing instructions for execution by the processing hardware 993. The memory hardware 991 may include volatile and/or non-volatile memory. The memory hardware 991 may store data pending processing by the processing hardware 993 and may store data resulting from processing by the processing hardware 993.

The processing hardware 993 comprises one or a plurality of interconnected and cooperative CPUs for processing data according to processing instructions stored by the memory hardware 991.

Implementations may comprise one computing device according to the hardware arrangement of FIG. 3, or a plurality of such devices operating in cooperation with one another.

A network interface 995 provides an interface for transmitting and receiving data over a network. Connectivity to one or more networks is provided. For example, a local area network and/or the internet. Connectivity may be wired and/or wireless.

Input devices 997 provide a mechanism to receive inputs from a user. For example, such devices may include one or more from among a mouse, a touchpad, a keyboard, an eye-gaze system, and a touch interface of a touchscreen. Inputs may be received over a network connection. For example, in the case of server computers, a user may connect to the server over a connection to another computing apparatus and provide inputs to the server using the input devices of the another computing apparatus.

A display unit 999 provides a mechanism to display data visually to a user. The display unit 999 may display user interfaces by which certain locations of the display unit become functional as buttons or other means allowing for interaction with data via an input mechanism such as a mouse. A server may connect to a display unit 999 over a network.

Methods and processes illustrated in FIGS. 1 and 2 may be carried out by one or more computer-implemented methods or computing apparatus or processor, having the arrangement illustrated in FIG. 3 and causing or executing processing instructions stored on a memory in the form of a computer program. Such a computer program may be stored on a non-transitory computer-readable medium or media.

Figure 4:
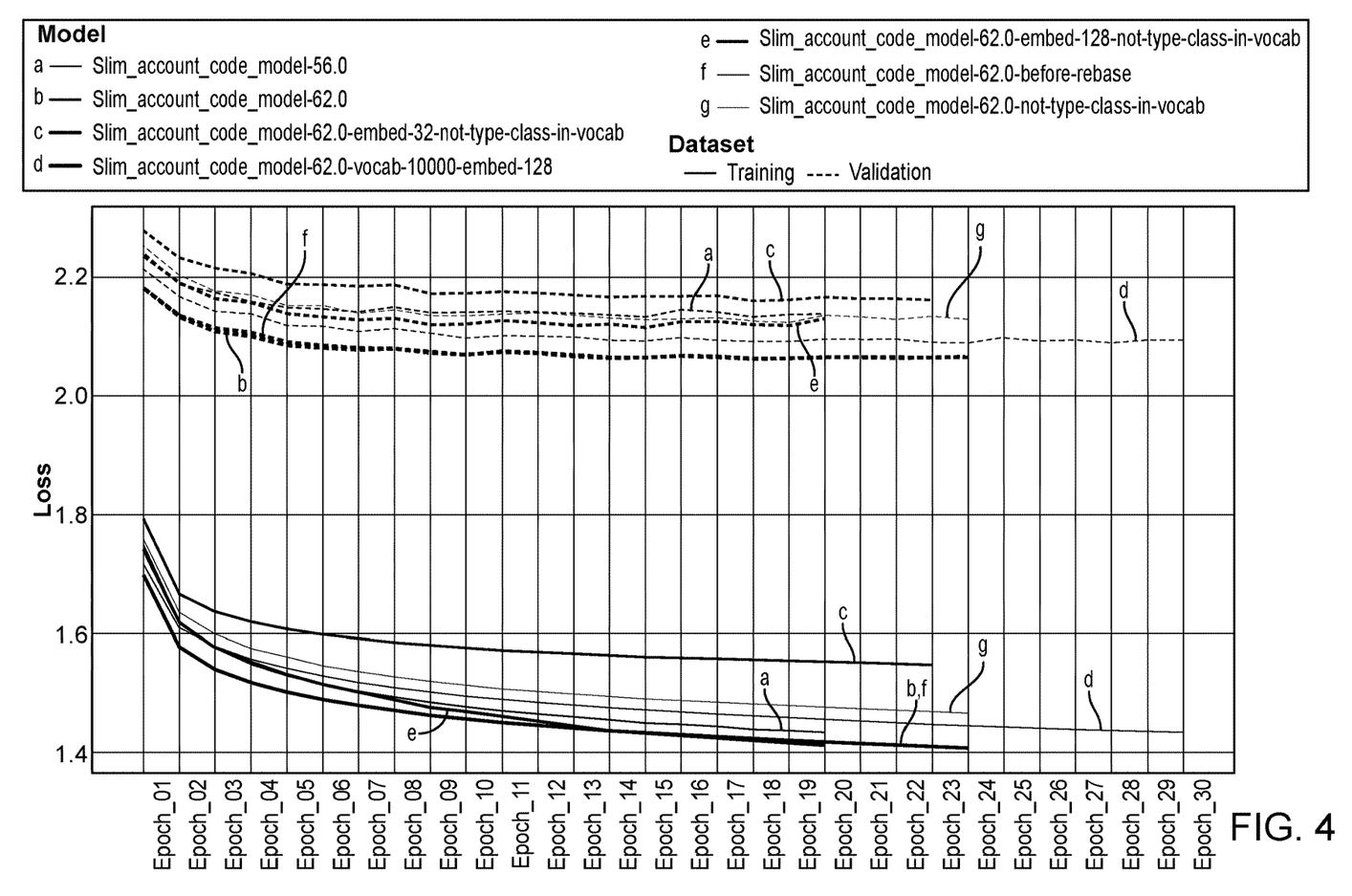
FIG. 4 illustrates variation of a loss metric with epoch for each of seven different models.
Figure 5:
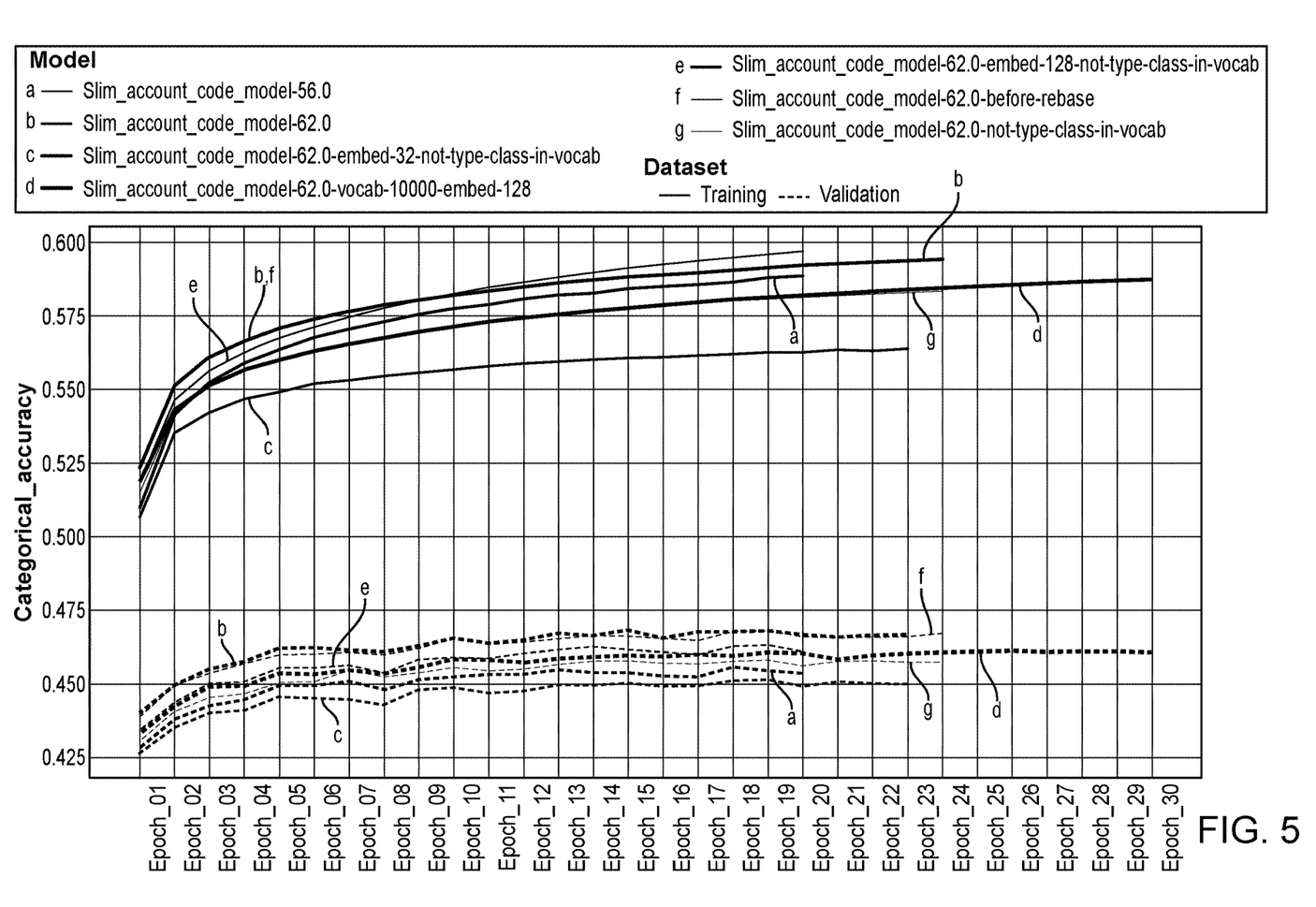
FIG. 5 illustrates variation of a metric assessing categorical accuracy with epoch for each of the seven different models.

FIGS. 4 & 5 illustrate performance of different configurations of the artificial neural network of the data processing function. In the FIGS. 4 & 5, comparison is made of processes exemplary of those set out in FIGS. 1 & 2, with a baseline process. Baseline process is included for purposes of comparison to highlight performance benefits achieved via processes exemplary of those set out in FIGS. 1 & 2. In the description of FIGS. 4 & 5, the terms exemplary processing or exemplary processes are used in relation to the processes exemplary of those set out in FIGS. 1 & 2. Where the baseline process is being discussed it will be explicitly referred to as such.

FIG. 4 illustrates variation of a loss metric with epoch for each of 7 different models labelled a to g and discussed in more detail below.

FIG. 5 illustrates a metric assessing categorical accuracy for each of the 7 different models. The exemplary processing to generate the results of FIGS. 4 & 5 includes a dataset creation step to generate training text statements, which are tokenized and the most frequent tokens identified (these being a reference set of text tokens). The hash values of the identified most frequent tokens are generated by a hashing algorithm, these hash values being a reference set of hash values. The same hashing algorithm is used to generate hash values throughout the exemplary processing. The same hashing algorithm used at training phase is used in a live, testing, or inference phase.

The generated training set has a number of unique text tokens, the said number being determined in the exemplary processing, and being stored as a vocabulary size. The number of buckets of the hashing algorithm is fixed based on the vocabulary size to be a number of times greater than or exceeding the vocabulary size, for example, the number of bins of the hashing algorithm may be 100, 200, 500, or 1000 times the vocabulary size. The vocabulary size may be 20000 or 40000 text tokens, whereas the number of bins may be 5 million or 10 million. There may be plural hashing algorithms available with the exemplary processing including selecting one from the plural based on the vocabulary size and a predefined requirement for minimum number of bins relative to vocabulary size.

The vocabulary size in the baseline process is similar to that of the exemplary processes.

In the exemplary training process, the training set used to train a data processing function is encoded versions of the text statements in the generated training set. The encoded versions comprise, for each text token that hashes to one of the reference set of hash values, the hash value; and for each remaining text token, a nil, null, or generic value.

The data processing function is to predict reconciliation details that a user will assign to an input text statement summarizing a financial transaction. The prediction is based upon similarity between the input text statement and historical text statements to which reconciliation details have already been assigned. The data processing function leverages an artificial neural network to make the prediction.

The data processing function comprises an artificial neural network, such as a classifying artificial neural network or a ranking artificial neural network. The neural network is trained using input hash values. Furthermore, the exemplary processes constrain the number of entries in the embedding matrices to a controllable parameter n, which is a number n of most common text tokens identified in the input training text statements. That is, n is the number of hash values in the reference set. A number of hashing bins is configured according to the overall vocabulary size (i.e. number of unique text tokens across entire set of training text statements), so that risk of collisions is minimised. The vocabulary size in terms of unique text tokens in the training set of text statements may be around 20000 or 40000. The vocabulary size of the reference set of hash values is smaller than the vocabulary size of text tokens in the training set of text statements. The number of bins of the hashing algorithm is greater than the vocabulary size of the reference set of hash values. For example, the vocabulary size may be around 20000 or 40000, and the number of bins may be around 10 million. The vocabulary size of the reference set of hash values may be not more than a fifth, not more than a third, or not more than half of the vocabulary size of the training set of text statements.

The overall vocabulary size, ie the number of unique tokens observed in the training set, is used to calibrate the "number of bins" such that collisions are minimised.

In broad terms this is the relationship between the 3 quantities:

Reference set vocabulary size<training set vocabulary size<<number of bins

The example of FIGS. 4 & 5 show processes using dimension of embedding space n=32, n=64, and n=128 [1].

The configuration (vocabulary size=10 k, embedding dim=128) included on the plots demonstrates that for the same embedding matrix memory footprint (10 k*128=20 k*64) it is preferable to opt for a larger reference set vocabulary size rather than a larger embedding dimension. Therefore, embodiments may be configured with a reference set vocabulary size of 20000 and an embedding dimension of 64.

Therefore, in the exemplary process, performance advantages are gained of a large number of bins (around 10 million) to reduce hashing collisions, but with an embedding matrix dimension of, for example, 64. A vocabulary size of the reference set of hash values (i.e. corresponding to the number n being the number of text token values that retain their hashing value on input to the artificial neural network, the other text token values being reduced to a zero, nil, or some other generic value on input to the artificial neural network) is selected to be small enough to train the artificial neural network in a small number of epochs and to make accurate predictions with coverage extended in relation to a baseline. Exemplary values of n are 10000 and 20000.

Exemplary process includes a custom layer in the data processing function (implemented by an artificial neural network such as a ranking artificial neural network). The custom layer rules out or discards or sets to zero or some other fixed or generic value or in some other way homogenises hash values not belonging to the reference set. The baseline process included in results illustrated in FIGS. 4 & 5 for comparative purposes does not include such a custom layer. That is, the baseline process is essentially the same neural network architecture and embedding matrix size except that the preprocessing is not carried out, so for example, the number of bins of the hashing algorithm is set to equal the vocabulary size of the reference set of hash values.

An example of the data processing function being performed by the artificial neural network is to determine whether an input text statement (which may be a text string summarizing a financial transaction or some other event or object) sufficiently matches a historical text statement which has been manually assigned a label or manually assigned one or more properties (e.g reconciliation details) by the user, so that a prediction is made that the same label or one or more properties are to be automatically or semi-automatically assigned to the input text statement by the application. Artificial neural network ranks historical text statements for similarity to input text statement and quantifies degree of similarity. Historical text statement having greatest degree of similarity to input text statement and degree of similarity over a threshold is a positive with respect to coverage [2]; the associated label or properties (i.e. reconciliation details) associated with the said historical text statement may be referred to as a prediction. Historical text statement having greatest degree of similarity to input text statement and degree of similarity less than the threshold is a negative with respect to coverage. In a live implementation of the data processing function, a positive result would automatically or semi-automatically have its reconciliation details copied to the input text statement. User inconvenience associated with manually inputting reconciliation details is reduced or avoided.

The system is calibrated based on a 90% accuracy requirement. That is to say, after running a validation set through the trained artificial neural network, the threshold resulting in a system which would be accurate 9 times out of 10 is sought, if the system is only to return predictions with a degree of similarity over the said threshold. Thus, the threshold is the degree of similarity that gives 90% accuracy of output prediction, and so the threshold itself is determined empirically according to processing of the validation set.

Coverage of the data processing function is a statistic representing a proportion of input text statements for which the data processing function is able to make a prediction of a label. In the processing producing the experimental data in FIGS. 4 & 5, a minimum threshold confidence level is set. That is, the artificial neural network of the data processing function receives a test text statement, and processes the test text statement to output a predicted label and a confidence level. Coverage is a proportion of input text statements for which a prediction of confidence meeting a threshold is made. The threshold may be set by running a validation set through the system and finding a threshold level of similarity that [3] is 90% accurate in generating predictions. The coverage at 90% is the proportion of input text statements the system is able to make a prediction for, when the system has been calibrated to be 90% accurate, cf comment above.

Accuracy is a statistic representing a number of predictions that were an accurate predictor of the label the user actually assigned to the text statement.

Exemplary Process Using Reference Set Vocabulary Size 20000 and Embedding Dimension=64 Achieves (with Reference to Line b Slim_Account_Code_Model-62.0 in FIGS. 4 & 5):

Coverage at 90%: 16.20% (with validation dataset)
Coverage at 90%: 15.62% (with test dataset)
Overall accuracy: 46.68% (with validation dataset)
Overall accuracy: 46.13% (with test dataset)

Baseline [4] [JH5] Process Using Reference Set Vocabulary Size 20000 Achieves (with Reference to Line d Slim_Account_Code_Model-56.0 in FIGS. 4 & 5):

Coverage at 90%: 14.00% (with validation dataset)
Coverage at 90%: 13.82% (with test dataset)
Overall accuracy: 45.33% (with validation dataset)
Overall accuracy: 44.75% (with test dataset)

Regarding datasets and the relation between the different sets: the training dataset, test dataset, and validation dataset, are three distinct datasets extracted or otherwise drawn or derived from the same population of input text statements and do not overlap. For example the population of input text statements may be historically input text statements to a particular data processing function of the application. The neural network is trained by processing the training dataset. The validation set is to track the neural network performance throughout the training and, as set out above, to determine threshold similarity required to achieve 90% accuracy of predictions. The test dataset is required in exceptional circumstances such as to report performance. Hence, embodiments may be configured using only training dataset and validation dataset.

Experimental results illustrated in FIGS. 4 & 5 show loss and accuracy at 90% [6] prediction accuracy for different artificial neural network models with a training dataset (solid lines) and with a validation data set (dashed lines). FIGS. 4 & 5 also show results for different processes for converting transaction details to input text statement, wherein a detail "class" may be included in the vocabulary (lines a b d f) or excluded (lines c e g).

Line a shows results for the baseline model.

Line b shows results for a model of an exemplary process and with an embedding dimension=64.

Line c is as line b but excludes the class detail from the vocabulary. Line d reduces reference set vocabulary size (20000 in other models) to 10000 and uses an embedding dimension=128.

Line d changes the embedding matrix dimensions but keeps the number of weights the same, noting that 64*20000=128*10000. FIGS. 4 and 5 demonstrate that equivalent embedding matrix capacities by with relatively lower reference set vocabulary size results in a performance decrease.

Line e excludes the class detail from the vocabulary and uses an embedding dimension=128.

Line f shows results for a model before rebase and with an embedding dimension=64. Line f is a variant of line b based on a different training codebase than was used to train the baseline a. Thus, line f is based on the same embedding matrix configuration a line b, but a different training codebase. Lines b and f demonstrate that for different codebases, the preprocessing steps illustrated in FIGS. 1 and 2, achieve performance benefits when compared with the baseline model.

Line g shows results for a model with an embedding dimension=64.

Results show that the exemplary process outperforms the baseline for the metrics of interest and presents better learning curves.

From the graph comparisons it is noticeable that reducing collisions while keeping same vocabulary size and embedding dimension slow down overfitting.

Embedding dimension=64 performs better than lower dimension=32. Larger embedding dimension=128 improves performance but overfitting picks up.

Representing account classes in the vocabulary results in performance gain.

Equivalent capacities but with lower vocabulary size results in a performance decrease.

It is noted that memory requirement of embedding matrix is proportional to vocabulary size of reference set of hash values multiplied by embedding dimension, and so information in FIGS. 4 and 5 demonstrates that best performance for given memory usage is achieved by increasing size of reference set of hash values rather than increasing embedding dimension.

The invention claimed is:

1. A computer-implemented method of providing a data processing function for processing text statements, comprising:

in a training and preprocessing phase of the data processing function:
tokenizing each of a plurality of training text statements into respective training sets of text tokens;
determining, among a plurality of training sets of text tokens, a vocabulary size, being a number of unique text tokens, and a reference set of text tokens, being a subset of the unique text tokens selected by applying a usage criteria to each of the unique text tokens;
generating a reference set of hash values by executing a hashing algorithm on each of the reference set of text tokens, the hashing algorithm being configured to have a number of bins exceeding the vocabulary size;
for each tokenized training text statement, producing an encoded version of the respective training text statement comprising:
for each text token that hashes to one of the reference set of hash values, the hash value; and
for each remaining text token, a nil, null, or generic value, training the data processing function based on the encoded versions of the tokenized text statements;
in a live phase of the data processing function:
producing an encoded version of a tokenized input text statement comprising:
for each text token that hashes to one of the reference set of hash values, the hash value; and
for each remaining text token, a nil, null, or generic value, executing the trained data processing function on the encoded version of the input text statement, wherein the nil, null, or generic value is a generic value, being a fixed common value, and
producing the encoded version of the tokenized input text statement and/or producing the encoded version of the tokenized training text statement, includes replacing any hash value that does not match a member of the reference set of hash values with the generic value.

2. The computer-implemented method according to claim 1, wherein the training and preprocessing phase further comprises determining an n most common text tokens, and wherein the usage criteria is satisfied if a text token is a member of the n most common text tokens.

3. The computer-implemented method according to claim 1, wherein the data processing function comprises an artificial neural network including an embedding layer, the embedding layer comprising an embedding matrix in which each hash value of the reference set of hash values maps to a unique row, each row defining a vector for a member of the reference set of hash values mapping to the row, the vector being an m-dimensional embedding.

4. The computer-implemented method according to claim 3, wherein
in the live phase, the artificial neural network is configured to predict a label, from among a defined set of labels, a user will assign to an input text statement;
in the training and preprocessing phase:
a label is associated with each training text statement via manual or semi-manual assignment;
the vector for each of the reference set of hash values being configured according to the labels assigned to training text statements for which the respective hash value appears in the encoded version.

5. The computer-implemented method according to claim 3, wherein
in the live phase, the artificial neural network is configured to generate a quantitative representation of a likelihood of each of a predefined list of labels being assigned to an input text statement by a user;
in the training phase:
a label is associated with each training text statement via manual or semi-manual assignment;
the vector for each of the reference set of hash values being configured according to the labels assigned to training text statements for which the respective hash value appears in the encoded version.

6. The computer-implemented method according to claim 3, wherein the artificial neural network comprises a custom layer preceding the embedding layer, the custom layer being configured to accept, as an input, in the training phase the encoded version of the training text statement, and in the live phase the encoded version of the input text statement, to translate each hash value that matches one of the reference set of hash values into a pointer to the row of the embedding matrix mapped to by the respective hash value.

7. The computer-implemented method according to claim 6, wherein the embedding matrix has a number of columns, the number being 32, 64, or 128.

8. The computer-implemented method according to claim 1, wherein the hashing algorithm is configured to have a number of bins that is at least 100 times, at least 200 times, at least 500 times, or at least 1000 times, the vocabulary size of the training sets of text tokens.

9. The computer-implemented method according to claim 1, wherein a number n of most common text tokens is 10000, or 20000.

10. The computer-implemented method according to claim 1, wherein the number of bins of the hashing algorithm is greater than 1 million, greater than 5 million, or greater than 10 million.

11. A system comprising a user device and a server apparatus, the server apparatus comprising a memory and a processor and being configured to, in a training and preprocessing phase of a data processing function:
tokenize each of a plurality of training text statements into respective training sets of text tokens;
determine, among a plurality of training sets of text tokens, a vocabulary size, being a number of unique text tokens, and a reference set of text tokens, being a subset of the unique text tokens selected by applying a usage criteria to each of the unique text tokens;
generate a reference set of hash values by executing a hashing algorithm on each of the reference set of text tokens, the hashing algorithm being configured to have a number of bins exceeding the vocabulary size;
for each tokenized training text statement, produce an encoded version of the respective training text statement comprising:
for each text token that hashes to one of the reference set of hash values, the hash value; and
for each remaining text token, a nil, null, or generic value, train the data processing function based on the encoded versions of the tokenized text statements;
the user device comprising a memory and a processor and being configured to, in a live phase of the data processing function:
obtain a series of hash values by executing the hashing algorithm on each text token among a tokenized input text statement;
communicate the series of hash values to the server apparatus;
the server apparatus being configured to, in the live phase of the data processing function:
edit the series of hash values to produce an encoded version of the input text statement comprising:
for each hash value matching one of the reference set of hash values, the hash value; and
for each remaining hash value, a nil, null, or generic value, execute the data processing function on the encoded version of the input text statement; and
return an outcome comprising or based on a result of the execution of the data processing function to the user device,
wherein the nil, null, or generic value is a generic value, being a fixed common value; and
producing the encoded version of the tokenized input text statement and/or producing the encoded version of the tokenized training text statement, includes replacing any hash value that does not match a member of the reference set of hash values with the generic value.

12. The system according to claim 11, wherein the training and preprocessing phase further comprises determining the n most common text tokens, and wherein the usage criteria is satisfied if the text token is a member of the n most common text tokens.

13. The system according to claim 11, wherein the data processing function comprises an artificial neural network including an embedding layer, the embedding layer comprising an embedding matrix in which each hash value of the reference set of hash values maps to a unique row, each row defining a vector for the member of the reference set of hash values mapping to the row, the vector being an m-dimensional embedding.

14. The system according to claim 13, wherein
in the live phase, the artificial neural network is configured to predict a label, from among a defined set of labels, a user will assign to an input text statement;
in the training phase:
a label is associated with each training text statement via manual or semi-manual assignment;
the vector for each of the reference set of hash values being configured according to the labels assigned to training text statements for which the respective hash value appears in the encoded version.

15. The system according to claim 13, wherein
in the live phase, the artificial neural network is configured to generate a quantitative representation of a likelihood of each of a predefined list of labels being assigned to an input text statement by a user;
in the training phase:
a label is associated with each training text statement via manual or semi-manual assignment;
the vector for each of the reference set of hash values being configured according to the labels assigned to training text statements for which the respective hash value appears in the encoded version.

16. The system according to claim 13, wherein the artificial neural network comprises a custom layer preceding the embedding layer, the custom layer being configured to accept, as an input, in the training phase the encoded version of the training text statement, and in the live phase the encoded version of the input text statement, to translate each hash value that matches one of the reference set of hash values into a pointer to the row of the embedding matrix mapped to by the respective hash value.

17. The system according to claim 11, wherein the system comprises one or more computing apparatus each comprising a memory and a processor, the memory storing processing instructions for execution by the processor.

18. Non-transitory computer-readable media storing a computer program or computer programs which, when executed by processor hardware, cause the processor hardware to perform a method of providing a data processing function for processing sensitive text statements, comprising:
in a training and preprocessing phase of the data processing function:
tokenizing each of a plurality of training text statements into respective training sets of text tokens;
determining, among a plurality of training sets of text tokens, a vocabulary size, being a number of unique text tokens, and a reference set of text tokens, being a subset of the unique text tokens selected by applying a usage criteria to each of the unique text tokens;
generating a reference set of hash values by executing a hashing algorithm on each of the reference set of text tokens, the hashing algorithm being configured to have a number of bins exceeding the vocabulary size;
for each tokenized training text statement, producing an encoded version of the respective training text statement comprising:
for each text token that hashes to one of the reference set of hash values, the hash value; and
for each remaining text token, a nil, null, or generic value, training the data processing function based on the encoded versions of the tokenized text statements;
in a live phase of the data processing function:
producing an encoded version of a tokenized input text statement comprising:
for each text token that hashes to one of the reference set of hash values, the hash value; and
for each remaining text token, a nil, null, or generic value, executing the trained data processing function on the encoded version of the input text statement,
wherein the nil, null, or generic value is a generic value, being a fixed common value; and
producing the encoded version of the tokenized input text statement and/or producing the encoded version of the tokenized training text statement, includes replacing any hash value that does not match a member of the reference set of hash values with the generic value.

* * * * *